US008515933B2

(12) United States Patent
Tu et al.

(10) Patent No.: US 8,515,933 B2
(45) Date of Patent: Aug. 20, 2013

(54) VIDEO SEARCH METHOD, VIDEO SEARCH SYSTEM, AND METHOD THEREOF FOR ESTABLISHING VIDEO DATABASE

(75) Inventors: Jih-Sheng Tu, Yilan County (TW); Jung-Yang Kao, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 224 days.

(21) Appl. No.: 13/077,984

(22) Filed: Apr. 1, 2011

(65) Prior Publication Data
US 2011/0225136 A1 Sep. 15, 2011

Related U.S. Application Data

(63) Continuation-in-part of application No. 12/804,477, filed on Jul. 21, 2010.

(60) Provisional application No. 61/234,636, filed on Aug. 18, 2009.

(30) Foreign Application Priority Data

Apr. 30, 2010 (TW) .............................. 99113963 A
Dec. 1, 2010 (TW) .............................. 99141786 A

(51) Int. Cl.
*G06F 17/30* (2006.01)

(52) U.S. Cl.
USPC ..... 707/706; 707/741; 707/769; 707/E17.028

(58) Field of Classification Search
USPC ................................................ 707/706, 769
See application file for complete search history.

(56) References Cited

U.S. PATENT DOCUMENTS

| 5,796,434 | A | 8/1998 | Lempel |
| 7,710,498 | B2 | 5/2010 | Kondo et al. |
| 2003/0033347 | A1* | 2/2003 | Bolle et al. .................. 709/107 |
| 2004/0221143 | A1 | 11/2004 | Wise et al. |
| 2004/0258397 | A1 | 12/2004 | Kim |
| 2006/0028400 | A1 | 2/2006 | Lapstun et al. |
| 2007/0002946 | A1* | 1/2007 | Bouton et al. ........... 375/240.01 |
| 2008/0231745 | A1 | 9/2008 | Ogino et al. |
| 2008/0235283 | A1* | 9/2008 | Turnball et al. ............ 707/104.1 |
| 2008/0262996 | A1* | 10/2008 | Yogeshwar et al. ............. 707/1 |
| 2009/0086034 | A1* | 4/2009 | Nakamura et al. ......... 348/208.4 |
| 2009/0208106 | A1* | 8/2009 | Dunlop et al. ................ 382/173 |

OTHER PUBLICATIONS

Xie et al., "Efficient and Continuous Near-duplicate Video Detection", 2010 12th International Asia-Pacific Web Conference, Apr. 6-8, 2010, p. 260-266.

(Continued)

*Primary Examiner* — Shyue Jiunn Hwa
(74) *Attorney, Agent, or Firm* — Jianq Chyun IP Office

(57) ABSTRACT

A video search method including following steps is provided. Meta-data of a query clip is received, wherein the meta-data includes an index tag and a semantic pattern. One or more candidate clips are retrieved from at least one video database according to the index tag. The semantic pattern is compared with a semantic pattern of each of the candidate clips, and each of the candidate clips is marked as a returnable video clip or a non-returnable video clip according to a comparison result. The candidate clips marked as the returnable video clip are served as a query result matching the query clip. A video search system and a method for establishing a video database are also provided.

22 Claims, 17 Drawing Sheets

(56) References Cited

OTHER PUBLICATIONS

Zheng et al., "An Efficient Video Similarity Search Strategy for Video-On-Demand Systems", Broadband Network & Multimedia Technology, 2009. IC-BNMT '09. 2nd IEEE International Conference, Oct. 18-20, 2009, p. 174-178.

Kim et al., "Spatiotemporal Sequence Matching for Efficient Video Copy Detection", IEEE Transactions on Circuits and Systems for Video Technology, Jan. 2005,127-132, vol. 15, No. 1.

Hase et al., "New Efficient Video Similarity Searching Method with 2-Phase Filtering", Communications, Computers and signal Processing, 2003. PACRIM. 2003 IEEE Pacific Rim Conference on, Aug. 28-30, 2003, p. 245-248, vol. 1.

Joly et al., "Statistical similarity search applied to content-based video copy detection", Proceedings of the 21st International Conference on Data Engineering, 2005, p. 1-10.

Shamik Sural et al, "Segmentation and Histogram Generation Using the HSV Color Space for Image Retrieval", Image Processing. 2002. Proceedings. 2002 International Conference, issued on 2002, p. II-589-p. 11-592 vol. 2.

Te-Wei Chiang et al, "Performance Analysis of Color Components in Histogram-Based Image Retrieval", Symposium on Applications of Information, Management and Communication Technology, issued on 2006, p. 1-p. 8.

"First Office Action of China Counterpart Application", issued on Feb. 22, 2012, p. 1-p. 9.

"Non-final Office Action of US Parent Application", issued on Jan. 20, 2012, p. 1-p. 21.

"Final Office Action of US Parent Application", issued on May 14, 2012, p. 1-p. 18.

\* cited by examiner

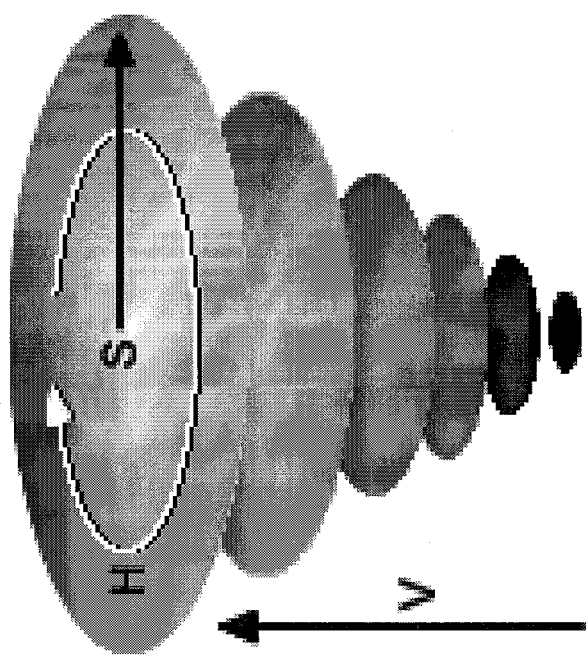

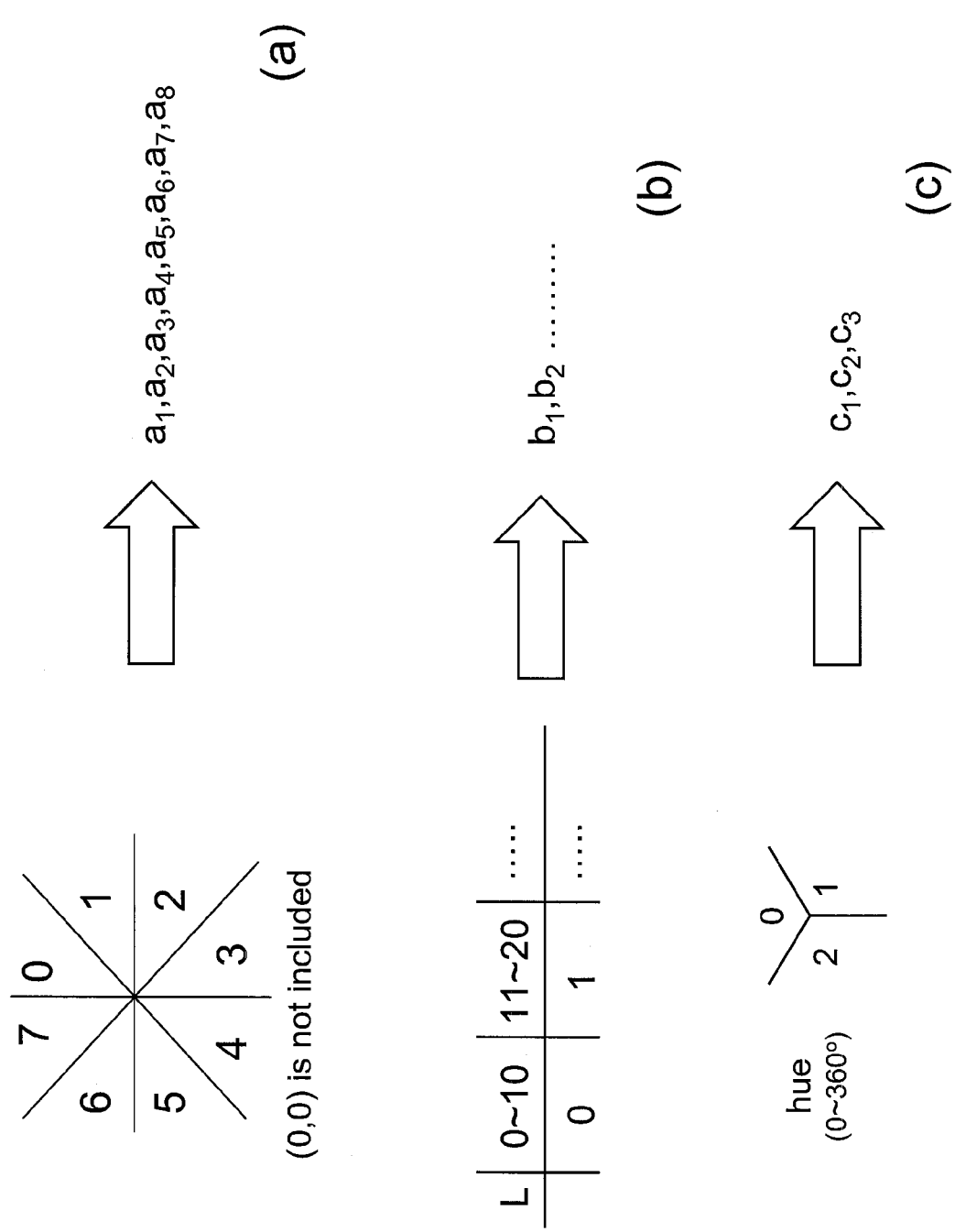

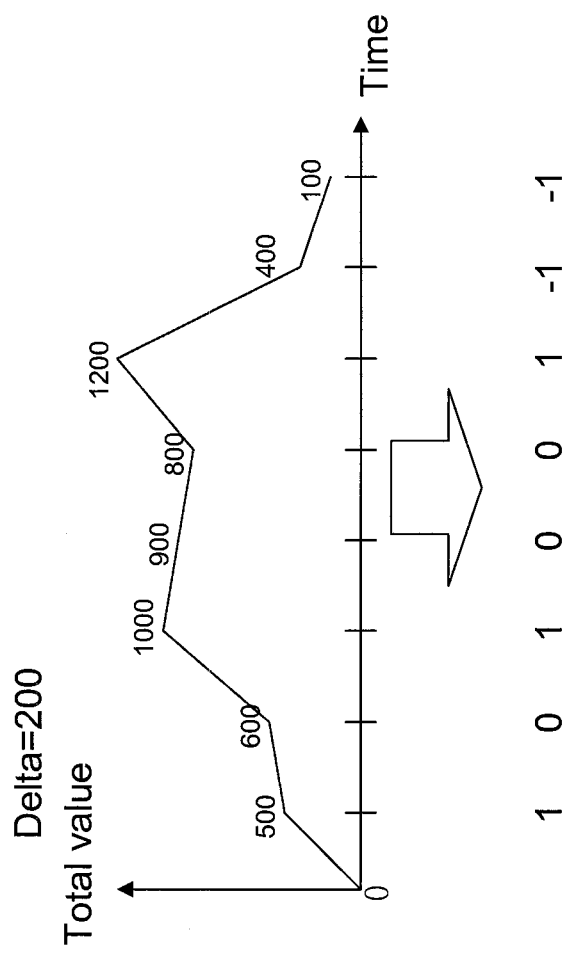

- Average query time : 3ms (612 min/1,100,000 Frame)
- Video section A : 13 seconds, Captured length = 25
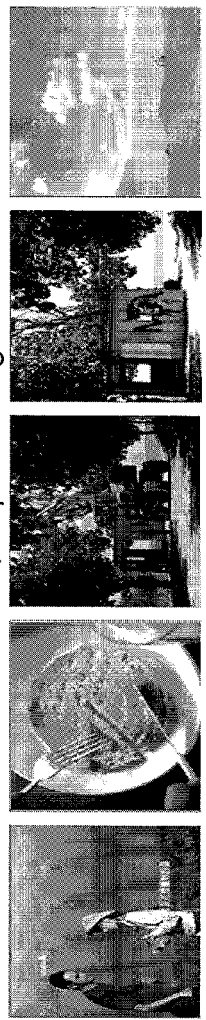
QP : 26
Index tag: [1] [2] [1]
Semantic pattern : 010-11-1-11-11-100011-1-10000000-1 ← Query clip
QP : 32
Index tag : [1] [2] [1]
Semantic pattern : ......000-110-11-11-100011-1-10000000-1...... ← Candidate clip
$$\text{Threshold} = \frac{3 \times \text{Capturedlength}}{10} = \frac{3 \times 25}{10}$$
→ Shortest distance = 2 <Threshold
→ Shortest distance = 19 >Threshold
Video section B : 13 秒
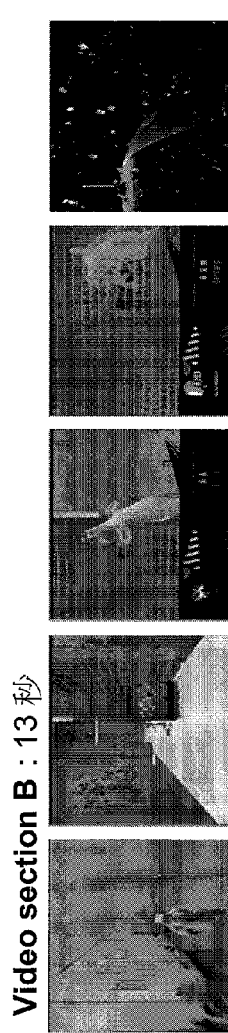
QP : 32
Index tag : [1] [2] [0]
Semantic pattern : ......10-1010000000001101-1-111-1-1-1-11......
FIG.10

VIDEO SEARCH METHOD, VIDEO SEARCH SYSTEM, AND METHOD THEREOF FOR ESTABLISHING VIDEO DATABASE

CROSS-REFERENCE TO RELATED APPLICATION

This is a continuation-in-part application of and claim the priority benefit of patent application Ser. No. 12/804,477, filed on Jul. 21, 2010, which claims the priority benefits of U.S.A. provisional application Ser. No. 61/234,636, filed on Aug. 18, 2009 and Taiwan application serial no. 99113963, filed Apr. 30, 2010. This application also claims the priority benefit of Taiwan application serial no. 99141786, filed Dec. 1, 2010. The entirety of each of the above-mentioned patent applications is hereby incorporated by reference herein and made a part of this specification.

TECHNICAL FIELD

The disclosure relates to a video search technique, and more particularly, to a video search method and a video search system in which a video content is served as a search condition, and a method thereof for establishing a video database.

BACKGROUND

All search engines currently used on the Web, such as Google, Yahoo, Youtube, and many other domestic search engines, are text-based. Even though each of aforementioned search engines is dedicated to break the limit of text-based search, for example, by hunting contents containing the keyword in both traditional Chinese and simplified Chinese (or even in other languages), the search result is still limited by the keyword. For example, when related multimedia data (audio or video files) is to be searched, it may not be possible to find the correct data or enough related data by using the keyword because of insufficient text content in the keyword or different translations of the keyword adopted by different countries.

The search engine Google started to offer an image search service since April, 2009, and this is the first service in the world which allows a user to search for related data according to an image content. For example, referring to FIG. 1A, when a keyword 110 ("apple") is input in the input field 120, data related to "apple" is displayed. Herein the related data includes all images containing an apple-shaped object and the cell phone ("iPhone") with the trademark "Apple®". Unwanted data can then be eliminated by performing further selections. For example, as shown in FIG. 1B, after a user selects an image containing an apple-shaped object, the search engine further displays images related to this fruit (apple). Or, as shown in FIG. 1C, after the user selects the image of "iPhone" with the trademark "Apple®", the search engine displays other images related to this product to allow the user to find the desired image. However, this technique is to look for images based on an image content, and which is limited to the search of related image files and does not work on multimedia files.

In order to resolve aforementioned problem, a standard for providing complementary data of a content (in particular, a digital multimedia content) is described in the MPEG-7 protocol established by the Motion Picture Expert Group (MPEG). According to this MPEG-7 standard, a corresponding multimedia content description independent of other MPEG standards is provided to a multimedia content, and the digital content description may even be attached to an analog movie file. A corresponding content description is provided to each audio-visual content, wherein the content description describes related characteristic values of the audio-visual content, and which is arranged in a file as:

AV+Descript+AV+Desript+AV+Desript+ . . .

Herein "AV" represents the audio-visual content, and "Descript" represents the corresponding content description. However, such a structure is very complicated and requires all multimedia files to be re-arranged therefore is not applicable to existing files and structures. Besides, even though related multimedia files can be located through keyword search by using the characteristic values, the technique is still limited by the text-based search with respect to different languages.

Additionally, inputting keywords on TV to search videos is unavoidable with the ongoing trend of Internet TV. How to accomplish a video search function on Internet TV by using remote control is one of the major subjects in the development of such applications.

SUMMARY

A video search method, a video search system, and a method thereof for establishing a video database are introduced herein.

According to an exemplary embodiment, a video search method including following steps is provided. Meta-data of a query clip is received, in which the meta-data includes a first index tag and a first semantic pattern. One or more candidate clips are retrieved from at least one video database according to the first index tag. The first semantic pattern is compared with a semantic pattern of each of the candidate clips, and each of the candidate clips is marked as a returnable video clip or a non-returnable video clip according to a comparison result. The candidate clips marked as the returnable video clip are served as a query result matching the query clip.

According to an exemplary embodiment, a method for establishing a video database in which videos can be queried according to a query clip is provided. The video database stores a plurality of video bitstreams and meta-data of the video bitstreams. Each meta-data is established through following steps. A segmentation process is performed on the video bitstream through a segmentation detecting procedure to generate a plurality of shots. The shots are indexed by assigning an index tag to each of the shots according to the content of the shot. A semantic pattern of each of the shots is established according to a video feature of the shot, wherein the meta-data includes at least the index tags and the semantic patterns corresponding to the shots.

According to an exemplary embodiment, a video search system including a search engine and at least one video database is provided. The search engine receives meta-data of a query clip, wherein the meta-data includes a first index tag and a first semantic pattern. The video database contains a plurality of video clips. The search engine retrieves one or more candidate clips from the video database according to the first index tag, compares the first semantic pattern with a semantic pattern of each of the candidate clips, and marks each of the candidate clips as a returnable video clip or a non-returnable video clip according to a comparison result. The candidate clips marked as the returnable video clip are served as a query result matching the query clip.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 5A is a diagram of a HSV color space.

FIG. 6 is a diagram illustrating how to assign index tag to each shot after a video file is segmented into a plurality of shots according to an embodiment of the disclosure.

FIGS. 7A-7D are diagrams illustrating how to generate a semantic pattern according to an embodiment of the disclosure.

FIG. 10 is a diagram illustrating how to select returnable video shots from candidate clips according to an embodiment of the disclosure.

DETAILED DESCRIPTION OF DISCLOSED EMBODIMENTS

An exemplary embodiment of the disclosure provides a new video search technique, in which the limit of existing text-based search techniques is broken and a video content can be used as a search condition for searching video results.

In an exemplary embodiment of the disclosure, part of a video file is selected as a query message. Herein a video file of any time length may be selected by a user as the query message, or a video file of a fixed or specific time length may be automatically selected through a user interface connection of the user end as the query message.

In an embodiment, aforementioned video file selecting operation may be built into a remote control device for controlling video playing, such as a TV or a DVD player. The video file selecting operation may also be built into a touch display or a user interface on a screen so that a user can conveniently select a video of a time length as the query message. However, the disclosure is not limited thereto.

The video file selected as the query message may have different name, format, or even image size and quality but the same plot if it belongs to the same film. Thus, films of the same or similar plot may be found as long as a search index is established regarding the selected video file. For example, the video file selected as the query message and all other video files to be searched may be converted into video files having the same format.

Because the concept of time domain is brought into some of the embodiments, video files corresponding to the same time domain section may be found among all other video files to be searched. Then, these video files are converted into video files having the same format. In an embodiment, all other video files to be searched may be stored in host of a local area network (LAN), a host database of a search engine, or a cloud database. The format conversion operation may be carried out in a personal computer (PC), a system server of a LAN, a host of a search engine, or a cloud computing system.

Figure 1A:
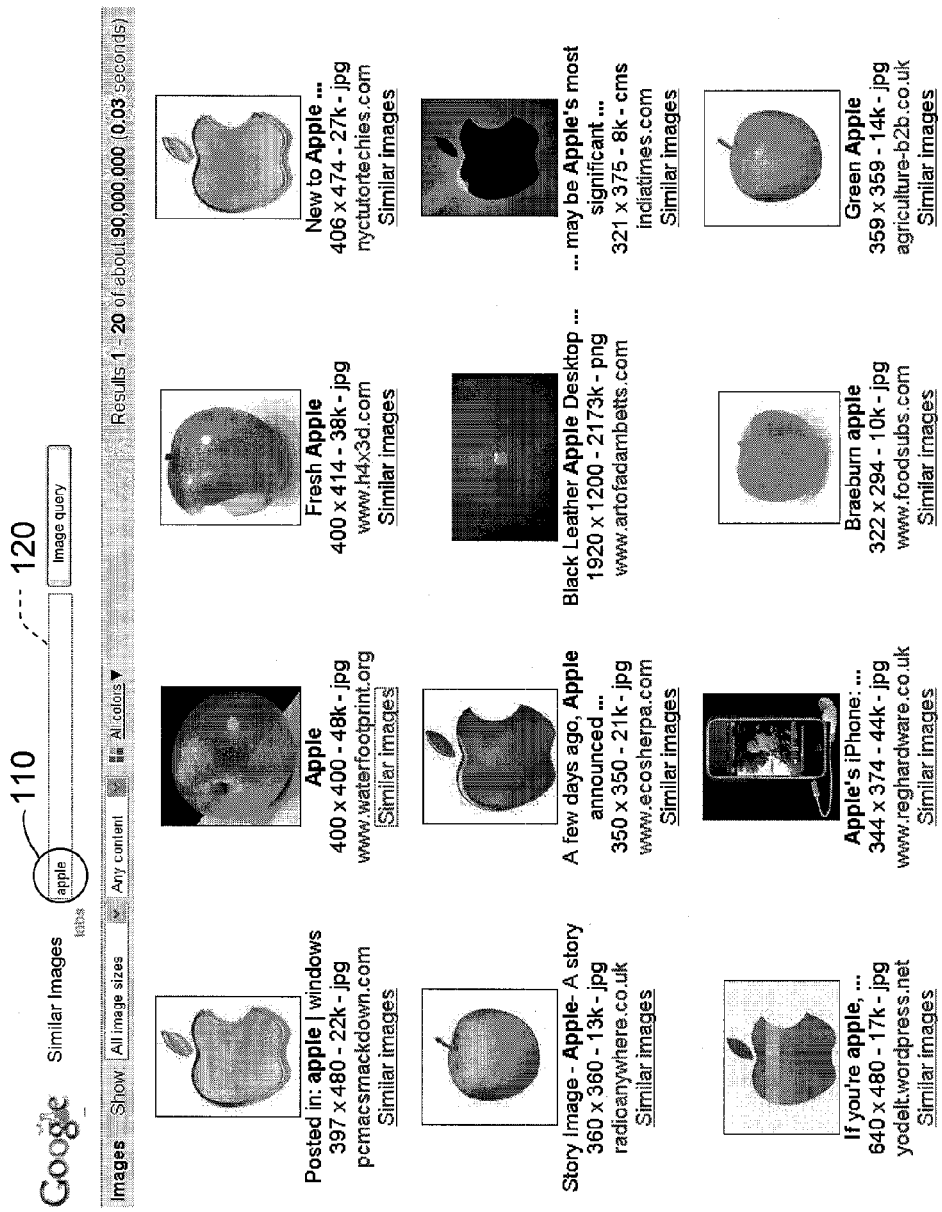
FIGS. 1A-1C are diagrams illustrating a conventional text-based image search technique.
Figure 1B:
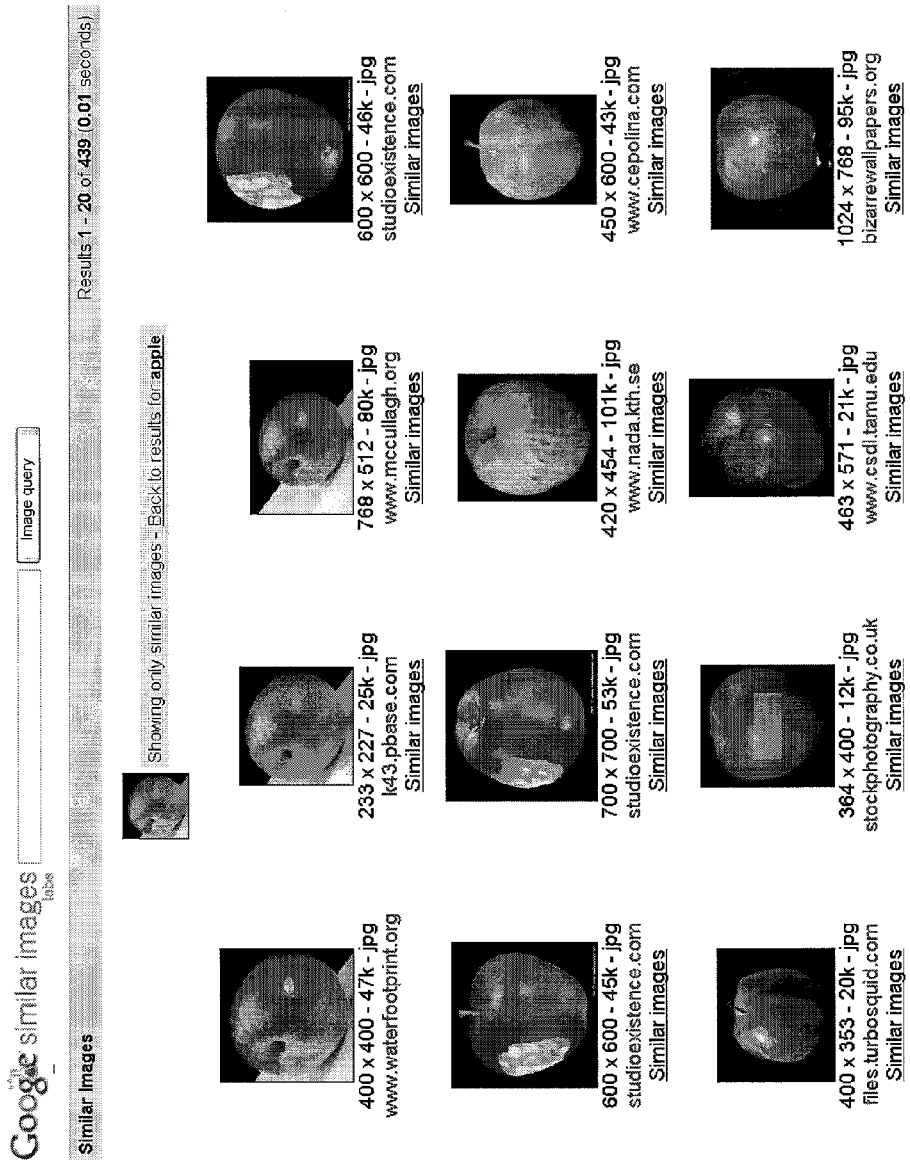
Figure 1C:
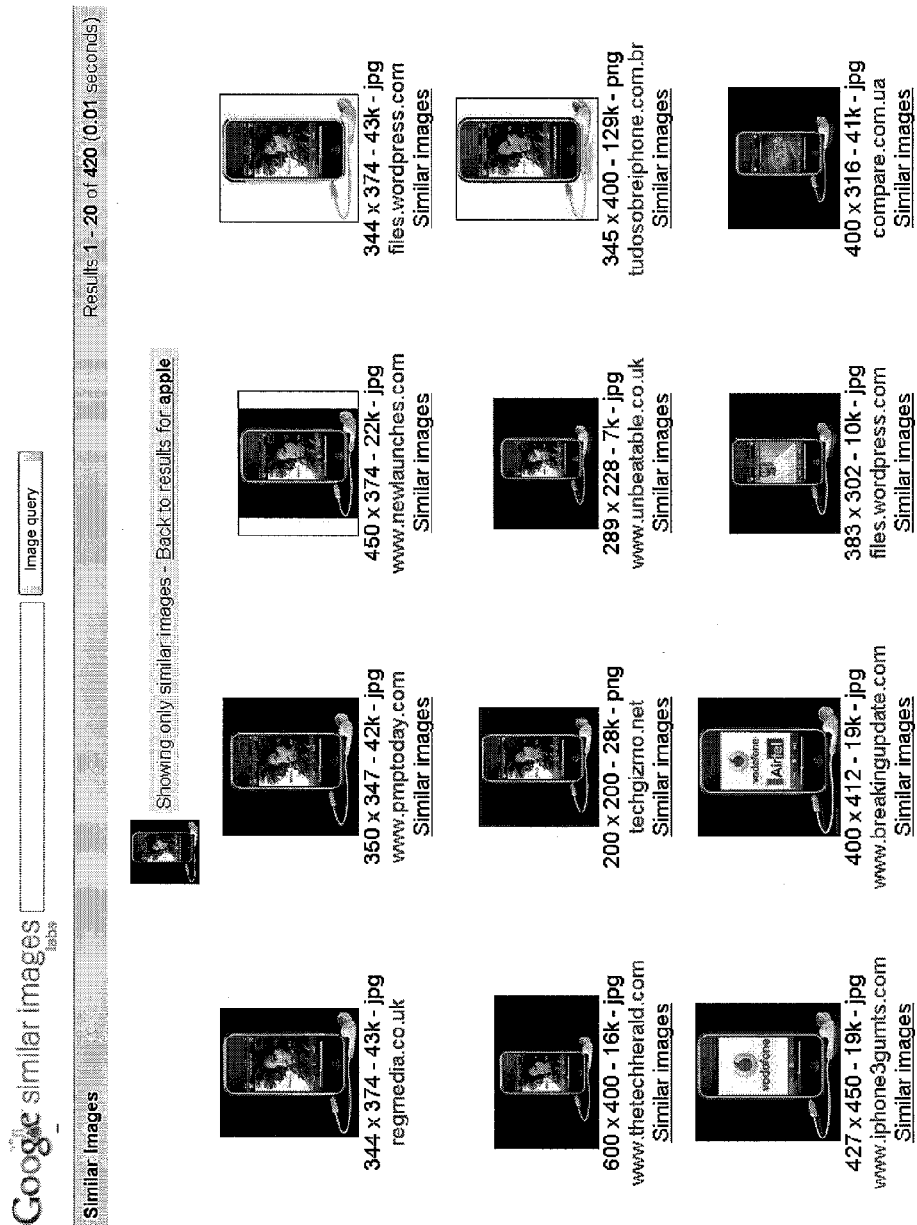
Figure 2A:
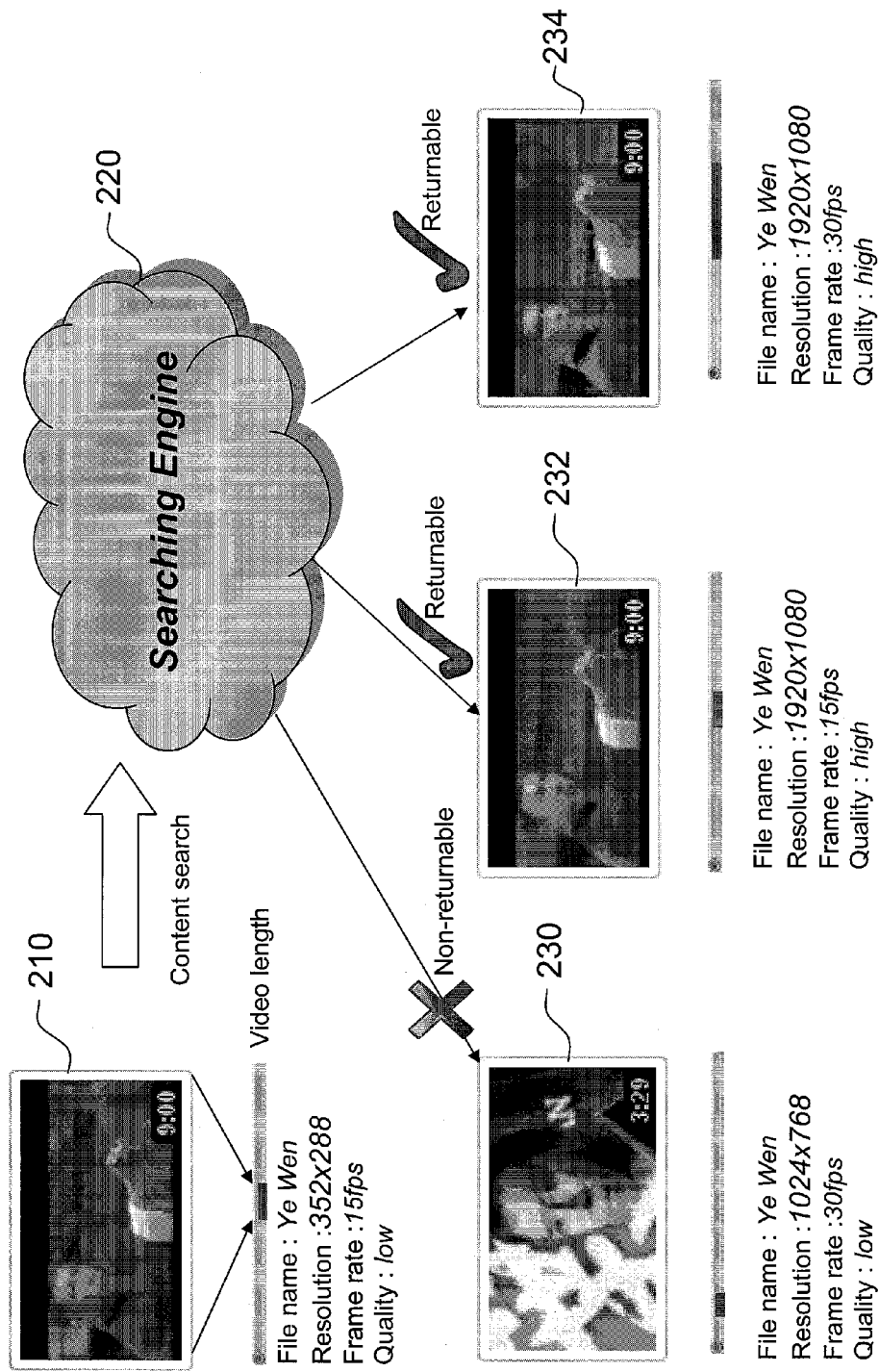
FIG. 2A and FIG. 2B are diagrams illustrating a video-based search procedure according to an exemplary embodiment of the disclosure.
Figure 2B:
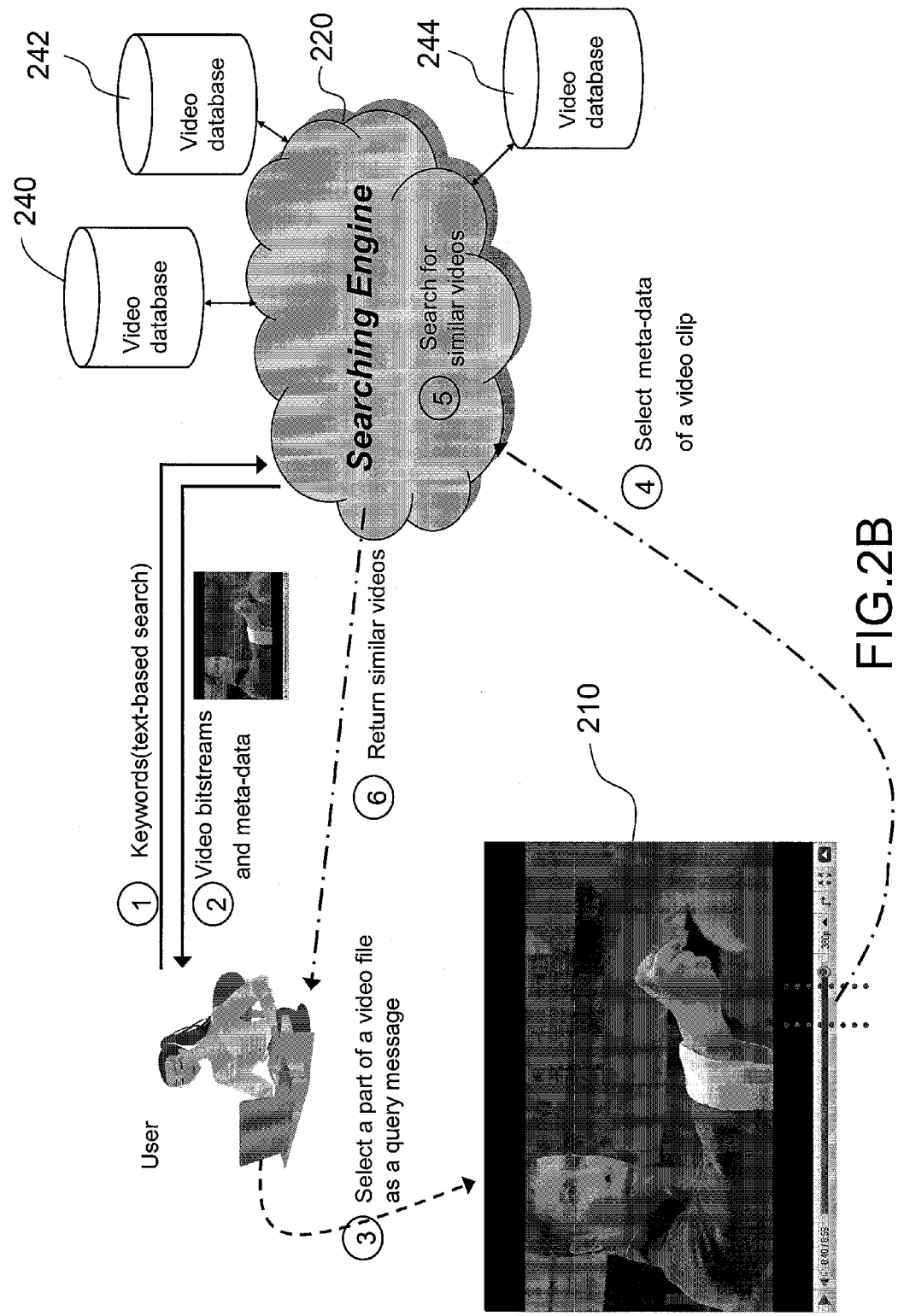

FIG. 2A and FIG. 2B are diagrams illustrating a video-based search technique according to an exemplary embodiment of the disclosure. In FIG. 2A, a short video file is selected as a query message to carry out a content search. Herein a video file of any time length may be selected by a user as the query message, or a video file of a fixed or specific time length may be automatically selected through a user interface as the query message.

As shown in FIG. 2A, when a user watches a video file with the title "Ye Wen", the resolution of the video file 210 is 352×288 (pixels), the frame rate thereof is 15 frames per second, and the image quality thereof is low. A short video file is selected as a query message, and the query message is sent to a search engine 220 to carry out a content search. After the content search is performed according to the search index established in the present embodiment, any video file (for example, the video file 230 as shown in FIG. 2A) that does not satisfy the query message is not returned.

On the other hand, since the video files 232 and 234 satisfy the query message of the content search, they are returned to the user. The video files (for example, the video files 230, 232, and 234 in FIG. 2A) retrieved through the content search may have different features. For example, the resolution of the video file 230 is 1024×768, the frame rate thereof is 30 frames per second, and the image quality thereof is low. The resolution of the video file 232 is 1920×1080, the frame rate thereof is 15 frames per second, and the image quality thereof is high. The resolution of the video file 234 is 1920×1080, the frame rate thereof is 30 frames per second, and the image quality thereof is high. A video file retrieved through content search may not have the same video file feature as the original one.

FIG. 2B is a diagram illustrating a content search procedure by selecting a video file as a query message. First, in the first step, a user inputs keywords in a text-based manner and selects a specific video file. Namely, the user first searches video files matching the keywords (i.e., the user first performs a text-based query by using the keywords). Then, in the second step, the search engine 220 sends a video bitstream and the meta-data thereof to the user. In the third step, the user is attracted by a specific section of the video file and wants to watch different versions (with different resolutions and/or different image qualities) of the section. In this case, the user can select a part of the video file as a query message. After that, in the fourth step, the meta-data of the selected video clip is sent to the search engine 220. In the fifth step, the search engine 220 searches in all available video databases (for example, the video databases 240, 242, and 244 in FIG. 2B) according to the selected video clip to find all similar video files. Next, in the sixth step, these similar video files are returned to the user to be selected by the user.

In an embodiment, the video databases 240, 242, and 244 may be stored in a remote host, such as a host in a LAN, a host database of a search engine, or a cloud database. The search engine 220 establishes a communication channel with the remote host for accessing the video database. The search engine 220 or the format conversion operation can be carried out in a PC, a system server of a LAN, a host of a search engine, or a cloud computing system.

The search engine 220 searches for similar video files in all available video databases according to the selected video clip. In an exemplary embodiment of the disclosure, the meta-data of each video file stored in the video databases has to be established before searching for the similar video files in the video databases.

In an exemplary embodiment of the disclosure, the method of searching similar video files may include two steps, but not limited thereto. First, the video databases are established, and then, the similar video clips are retrieved.

One embodiment of establishing the video databases may include: (1) segmenting and indexing a video file; and (2) establishing semantic patterns. Foregoing step (1) includes segmenting a video file into a plurality of video clips and assigning an index tag to each of the video clips. Foregoing step (2) may include establishing a semantic pattern of each video clip according to a video feature of the video clip.

One embodiment of retrieving similar video clips includes: (1) retrieving candidate clips; and (2) comparing semantic patterns. Foregoing step (1) includes searching for video clips having the same or similar index tags as candidate clips according to a selected video file (i.e., query message). Foregoing step (2) may include calculating a semantic distance between the query message and each candidate clip and comparing the semantic distance with a threshold to determine whether the candidate clip is a similar video clip.

Figure 3:
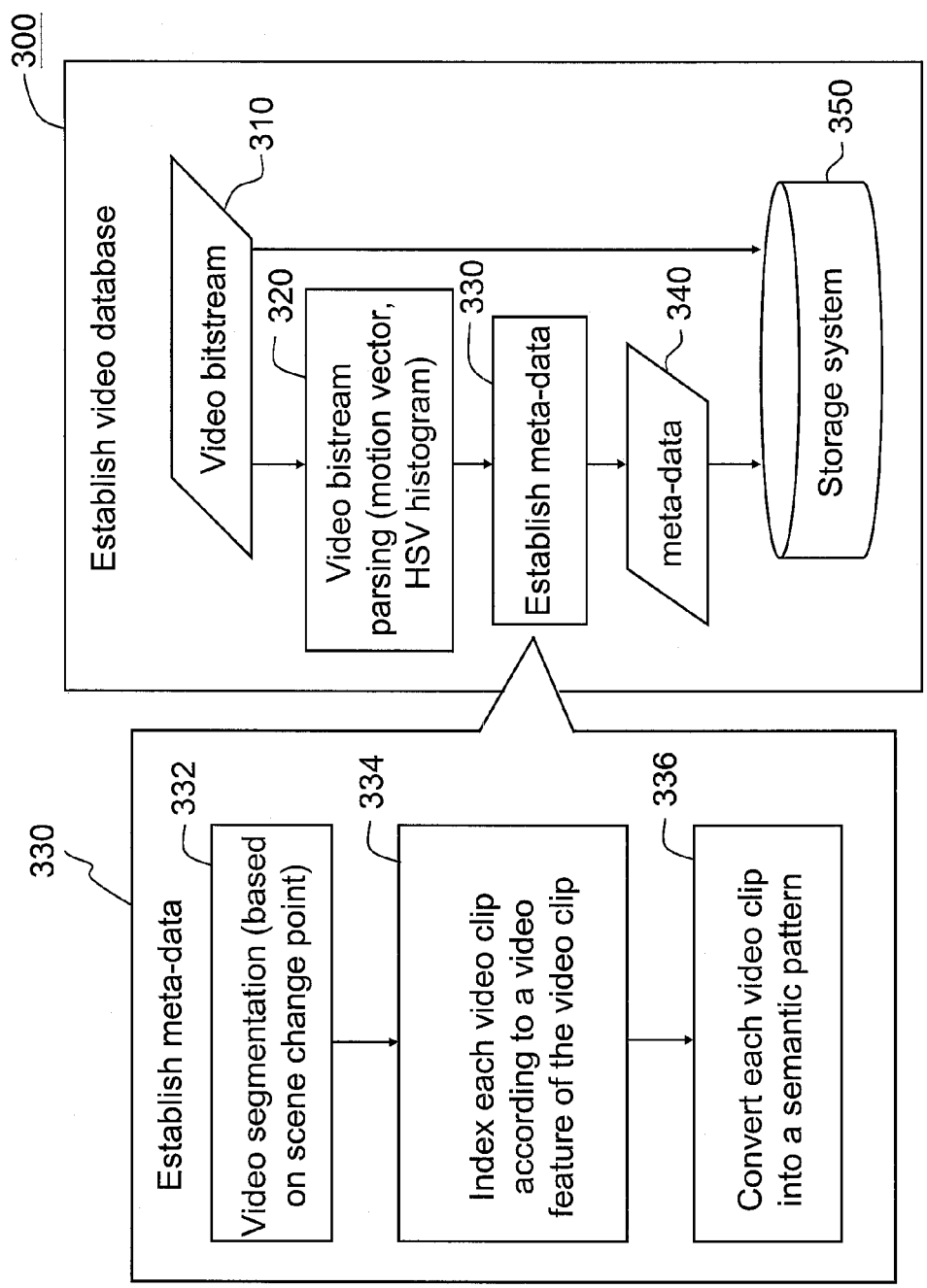
FIG. 3 is a diagram illustrating the procedure for establishing a video database according to an exemplary embodiment of the disclosure.

FIG. 3 is a diagram illustrating the procedure for establishing a video database according to an exemplary embodiment of the disclosure. In the video database establishing procedure 300, besides storing all the video files into a storage system 350, a video bitstream parsing step 320 and a meta-data establishing step 330 are further executed on the original video bitstream 310 of the video files and the corresponding meta-data is stored into the storage system 350.

Aforementioned video bitstream parsing step can be referred to applicant's applications. It is U.S. patent Ser. No. 12/804,477 with the title of "VIDEO SEARCH METHOD USING MOTION VECTORS AND APPARATUS THEREOF" (corresponding to the Taiwan Patent No. 099113963 with the title of "VIDEO SEARCH METHOD USING MOTION VECTOR AND APPARATUS THEREOF" disclosed in 30 Apr., 2010 or the P.R. China Patent No. 201010220461.1 with the title of "VIDEO SEARCH METHOD USING MOTION VECTOR AND APPARATUS THEREOF" disclosed in 29 Jun., 2010) disclosed in 21 Jul., 2010. The entirety of each of the above-mentioned patent applications is incorporated herewith by reference herein and made a part of this specification.

If the motion vector (MV) technique is adopted in the video bitstream parsing step, the bitstreams of all the video files, which are usually compressed data, are parsed, in which the MVs of corresponding frames may be selectively obtained in a specific proportion (for example, 1:2, 1:4, or 1:N, wherein N is the number of frames), so as to flexibly adjust the sampling rate in the time domain. In the present embodiment, converting all the video files (including the video file served as the search condition) into video files having the same format is to obtain the MVs in all the video files. Namely, the MVs may be obtained from all the compressed video files to establish the search indexes.

In the present embodiment, MVs of different resolutions may be adjusted through up sampling or down sampling. For example, a video file may usually include a plurality of frames that are sequentially arranged in the time domain, and each of the frames may include a plurality of macro blocks (MB). Each of the MBs may be a unit of 16×16. Each MB may be a 16×16 unit and may have 1 or 16 (one MB is further divided into 16 4*4 units) MVs. Accordingly, a single MB may have 1 to 16 MVs in video files of different formats, which brings inconvenience to the subsequent MV distance calculation. Thus, in order to achieve the same resolution, the numbers of MVs in all the MBs have to be adjusted into a same number. In an embodiment, an average technique may be adopted to convert n MVs into one MV, wherein an average value of the n MVs is calculated.

Additionally, if one MV is to be converted into n MVs, the single MV is converted into n MVs having the same value.

Moreover, how the number of MVs in a MB is converted may be determined through a statistical mechanism. For example, a group of pictures (GOP) is usually defined based on the MPEG video coding format. When continuous dynamic images are processed according to the MPEG-4 protocol, to achieve a better compression effect, the GOP may be defined to obtain random access operations in the image data. For example, according to the MPEG-4 protocol, the GOP contains 9 images (1 image I, 2 forwardly predicted images P, and 6 backwardly predicted images B). Thus, in an example, in order to determine the most suitable number of MVs, the number of MVs used for establishing the search indexes is determined according to whether the block sizes of macro blocks (MB) corresponding to the MVs in each GOP exceed a threshold.

In an embodiment, a HSV histogram parsing technique may also be adopted in the video bitstream parsing step. The HSV histogram parsing technique will be explained below with reference to an exemplary embodiment.

Figure 4:
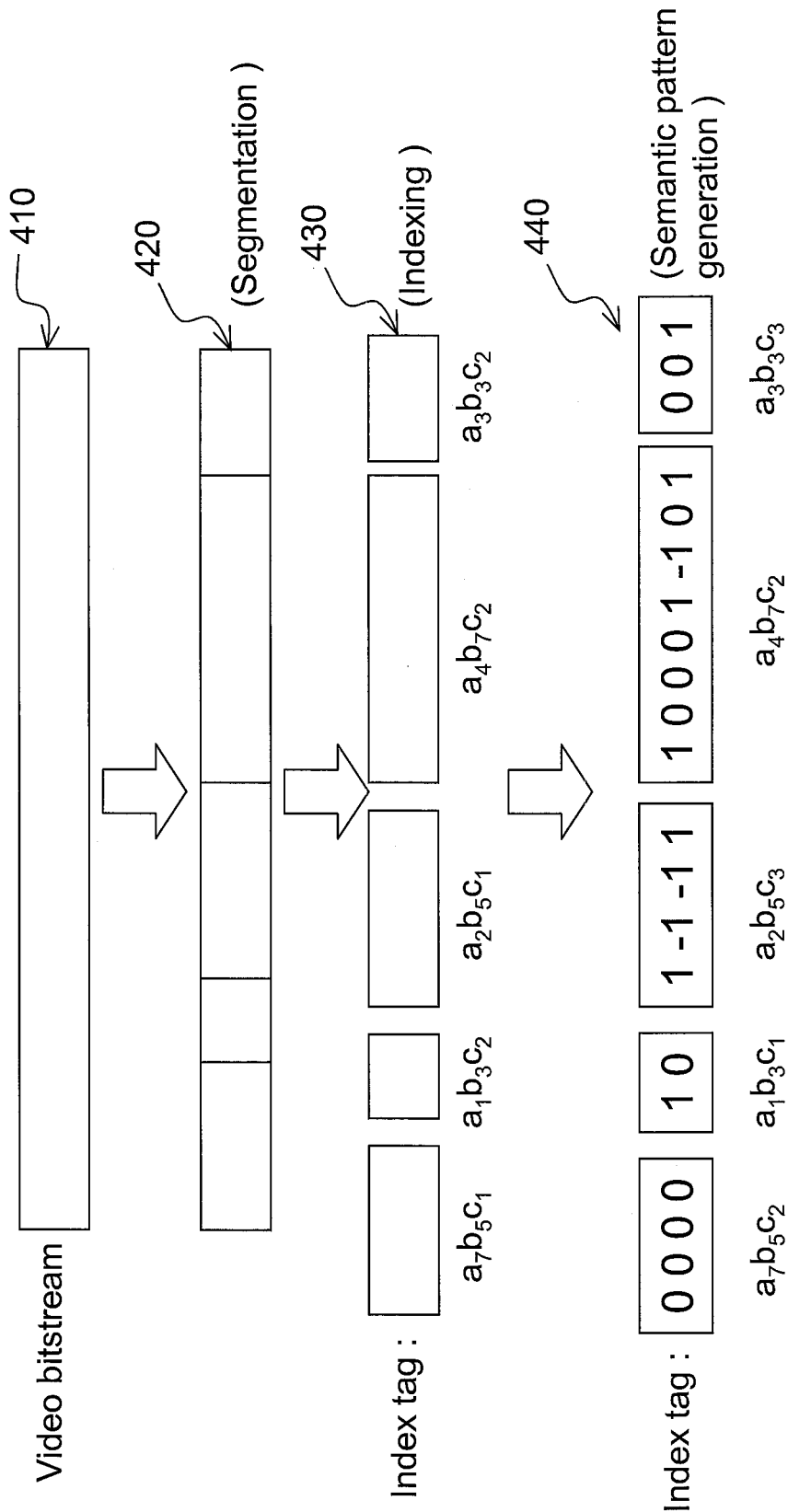
FIG. 4 is a diagram illustrating a method for establishing meta-data of a video bitstream according to an embodiment of the disclosure.

FIG. 4 is a diagram illustrating a method for establishing meta-data of a video bitstream according to an embodiment of the disclosure. Referring to FIG. 4, a video bitstream 410 is segmented into a segmented video file 420. As shown in FIG. 4, the segmented video file 420 may be converted into 5 different shots according to a scene change point. Then, the 5 shots are indexed into video clips 430 having different index tags. As shown in FIG. 4, the indexes of these 5 shots may be $a_7b_5c_1$, $a_1b_3c_2$, $a_2b_5c_1$, $a_4b_7c_2$, and $a_3b_3c_2$. Next, a semantic pattern of each video clip is established according to a video feature of the video clip. As shown in FIG. 4, the semantic patterns 440 of the 5 shots with the indexes $a_7b_5c_1$, $a_1b_3c_2$, $a_2b_5c_1$, $a_4b_7c_2$, and $a_3b_3c_2$ are respectively "0 0 0 0", "1 0", "1 −1 −1 1", "1 0 0 0 1 −1 0 1", and "0 0 1".

Below, the steps (i.e., in one embodiment, including (1) segmentation; (2) indexing; and (3) semantic pattern generation) for establishing meta-data in a video database will be respectively described.

Segmentation

The video files have to be segmented in an identical manner. In an embodiment, a video file may be segmented at a scene change point so that the obtained shots may have higher similarity. Each section of the video file obtained by segmenting the video file based on the scene change point may be referred to as a shot in the present embodiment.

In an embodiment, each shot may be selected through a HSV histogram parsing technique. Namely, whether a current frame is served as a shot boundary is determined according to the distance of HSV histogram between frames.

A HSV color space is a way of describing color based on the human being's visual system by using hue, saturation (or chroma), and value (intensity or brightness). A HSV color space can be visualized by using a cylindrical model, as shown in FIG. 5A, wherein H represents hue, S represents saturation, and V represents value. The cylindrical model for visualizing the HSV color space is very complicated by can reflect the variations of hue, value, and saturation clearly. Hue and saturation are usually referred to as chroma in general, and which is used for indicating the type and depth of color. Since human eye is more sensitive to brightness than to color and the HSV color space is more suitable for human's visual characteristics than the RGB color space, the HSV color space is usually adopted by the human being's visual system for the convenience of color processing and identification.

Figure 5B:
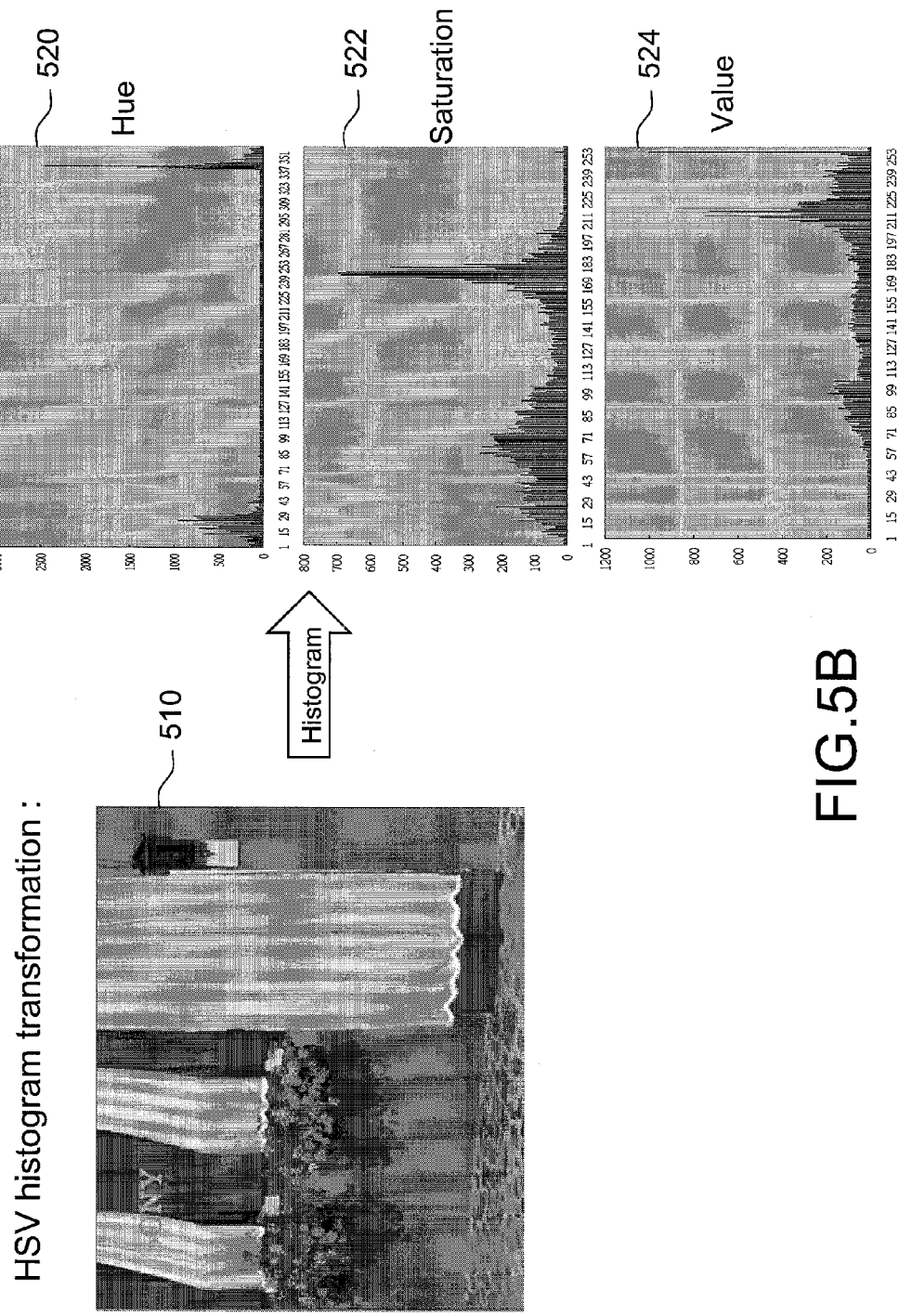
FIG. 5B illustrates how a HSV color space is transformed through a HSV histogram parsing technique.
Figure 5C:
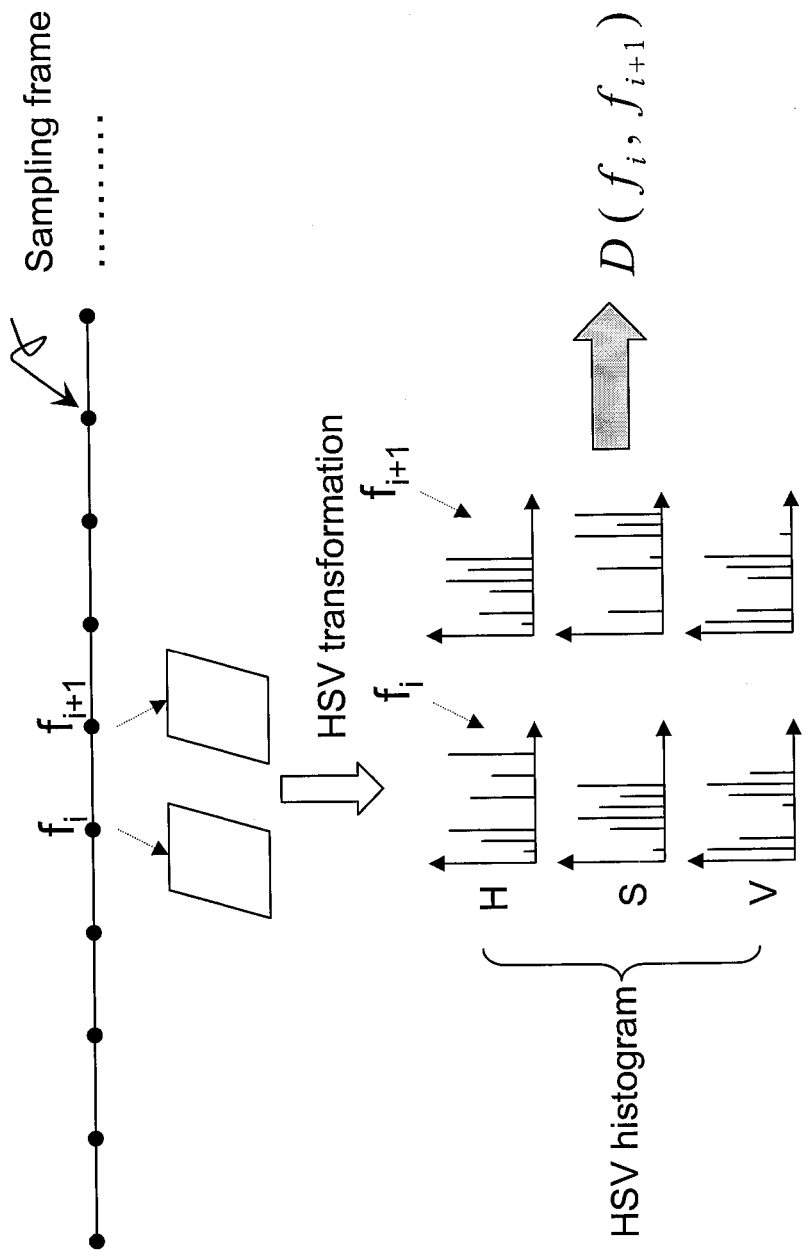
FIG. 5C is a diagram illustrating the procedure for transforming a video file into a HSV histogram through a HSV histogram parsing technique.

FIG. 5B illustrates how a HSV color space is transformed through a HSV histogram parsing technique. Each image file is transformed into three distribution graphs through histogram transformation, wherein the three distribution graphs include a hue distribution graph 520, a saturation distribution graph 522, and a value distribution graph 524. FIG. 5C is a diagram illustrating the procedure for transforming a video file into a HSV histogram through a HSV histogram parsing technique. Whether the current frame is served as a shot boundary is determined according to the obtained HSV histogram feature (a shot detection algorithm). Whether the frames are served as the shot boundaries is determined according to this feature.

For example, as shown in FIG. 5C, HSV transformation is performed on each sampling frame. For example the HSV distribution graph at the left is obtained after the frame $f_i$ is transformed, and the HSV distribution graph at the right is obtained after the frame $f_{i+1}$ is transformed. Thereafter, distances (D) between adjacent frames are calculated, as the distance $D(f_i, f_{i+1})$ in FIG. 5C.

The HSV histogram transformation and segmentation described above can be referred to the article of "SEGMENTATION AND HISTOGRAM GENERATION USING THE HSV COLOR SPACE FOR IMAGE RETRIEVAL" disclosed by Shamik Sural, Gang Qian, and Sakti Pramanik in IEEE ICIP 2002 or the distance measurement technique disclosed by Te-Wei Chiang, Tienwei Tsai, and Mann-Jung Hsiao in "Performance Analysis of Color Components in Histogram-Based Image Retrieval". The reference is incorporated herewith by reference herein and made a part of this specification.

Indexing

After a video file is segmented into several shots, these shots are assigned with index tags. There are many ways to assign index tag to each shot. In some embodiments, the shots may be indexed according to the MVs, lengths, distributions in the color space (for example, the angles of hue), or any other feature of the shots or a combination of foregoing features.

Referring to FIG. 6, in an embodiment, the index tags may be assigned according to one or combination of the following factors: (a) distribution of MV directions, (b) lengths of the shots, and (c) and distributions of angles of hue in the color space. As shown in FIG. 6(a), the directions of MVs are distributed in 8 quadrants ($a_1, a_2, a_3, a_4, a_5, a_6, a_7, a_8$). As shown in FIG. 6(b), different indexes ($b_1, b_2, b_3, b_4, \ldots$) are assigned according to the lengths of the shots. As shown in FIG. 6(c), the angles of hue are distributed in 3 quadrants ($c_1, c_2, c_3$).

Semantic Pattern Generation

In order to perform similarity comparison between video bitstreams quickly, a video file containing a large quantity of data has to be converted into meaningful symbols so that the quantity data to be compared can be reduced. Herein the symbols are referred to as a semantic pattern.

Figure 7A:
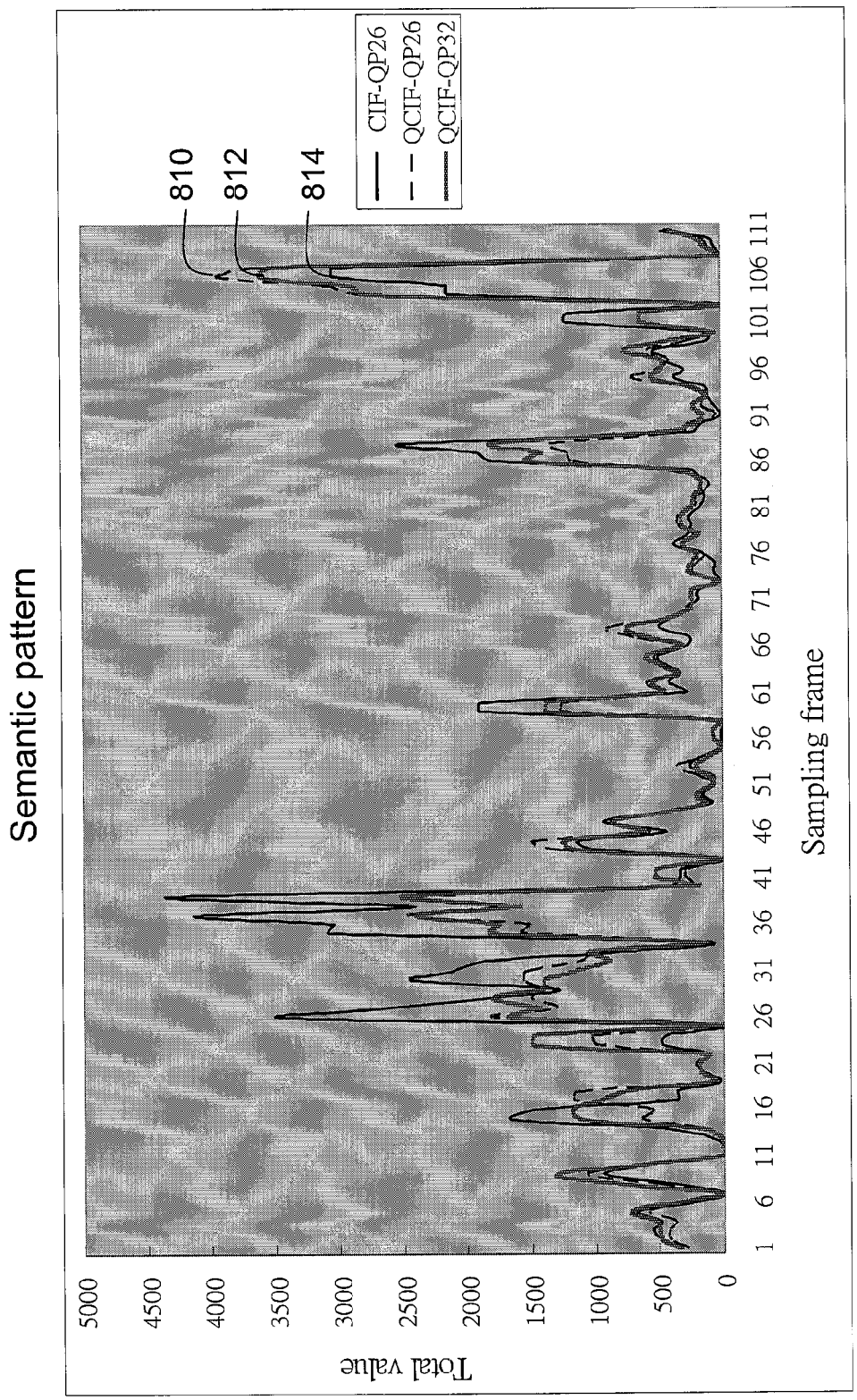

Referring to FIG. 7A, in an actual verification embodiment, the total MV differences 810, 812, and 814 of a video file in the QCIF-QP26 format, a video file in the QCIF-QP32 format, and a video file in the CIF-QP26 format are respectively obtained. The common image format (CIF) is usually a 352×288 format, and QCIF (i.e., quarter common image format) is usually a 176×144 format. As shown in FIG. 7A, two videos of the same content have highly similar total MV differences even if they have different qualities or resolutions.

In an embodiment, the method for establishing semantic patterns includes following steps. MVs between frames are subtracted, and the lengths of the result vectors are calculated. Then, the lengths are added up and served as correlations between the frames. Through a predetermined conversion operation, "1" is obtained if the obtained total amount is greater than a current total amount for a Delta value, "−1" is obtained if the obtained total amount is smaller than the current total amount for the Delta value, and "0" is obtained in other cases, as shown in FIG. 7B and FIG. 7C. Through foregoing steps, a video file is converted into a semantic pattern composed of 1, 0, and −1. A video bitstream is segmented into a plurality of shots through foregoing steps. Thereafter, a specific index tag and a specific semantic pattern are generated for each of the shots.

Figure 7D:
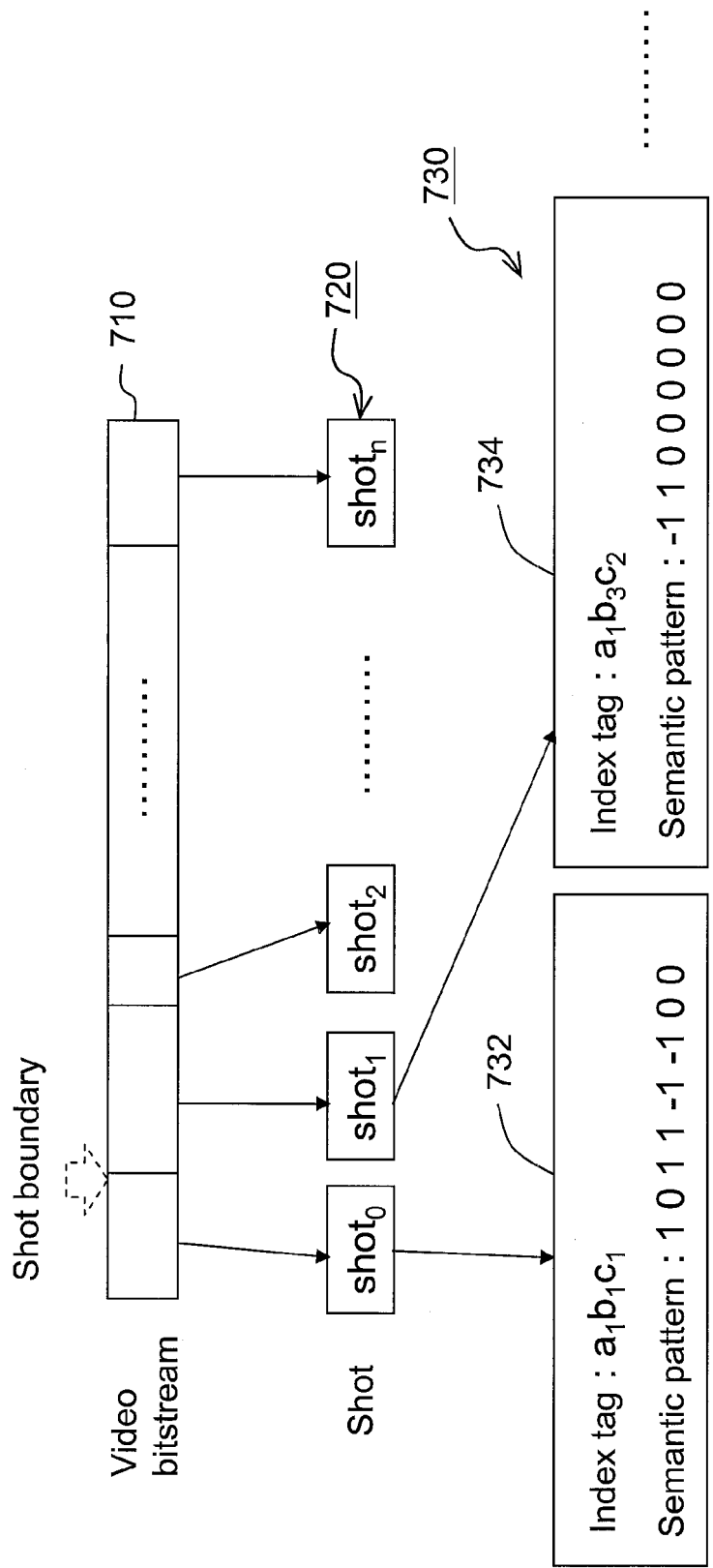

As shown in FIG. 7D, after the video bitstream 710 is segmented into a plurality of shots $shot_0, shot_1, shot_2, \ldots,$ and $shot_n$ 720, these shots are assigned with different index tags and semantic patterns 730. For example, the shot $shot_0$ has an index tag $a_1 b_1 c_1$ and a semantic pattern (1 0 1 1 −1 −1 0 0), as indicated by the reference numeral 732. The shot $shot_1$ has an index tag $a_1 b_3 c_2$ and a semantic pattern (−1 1 0 0 0 0 0 0), as indicated by the reference numeral 734. Herein the index tags have values as shown in FIGS. 6(a), (b), and (c).

Retrieving Similar Video Clips

The step of retrieving similar video clips may include: (1) retrieving candidate clips; and (2) comparing semantic patterns. Foregoing step (1) may include searching for video clips having the same or similar index tags as candidate clips according to a selected section of a video file (i.e., query message). Foregoing step (2) may include calculating the semantic distances between the query message and all the candidate clips and comparing each semantic distance with a threshold to determine whether the corresponding candidate clip is a similar video clip.

Figure 8:
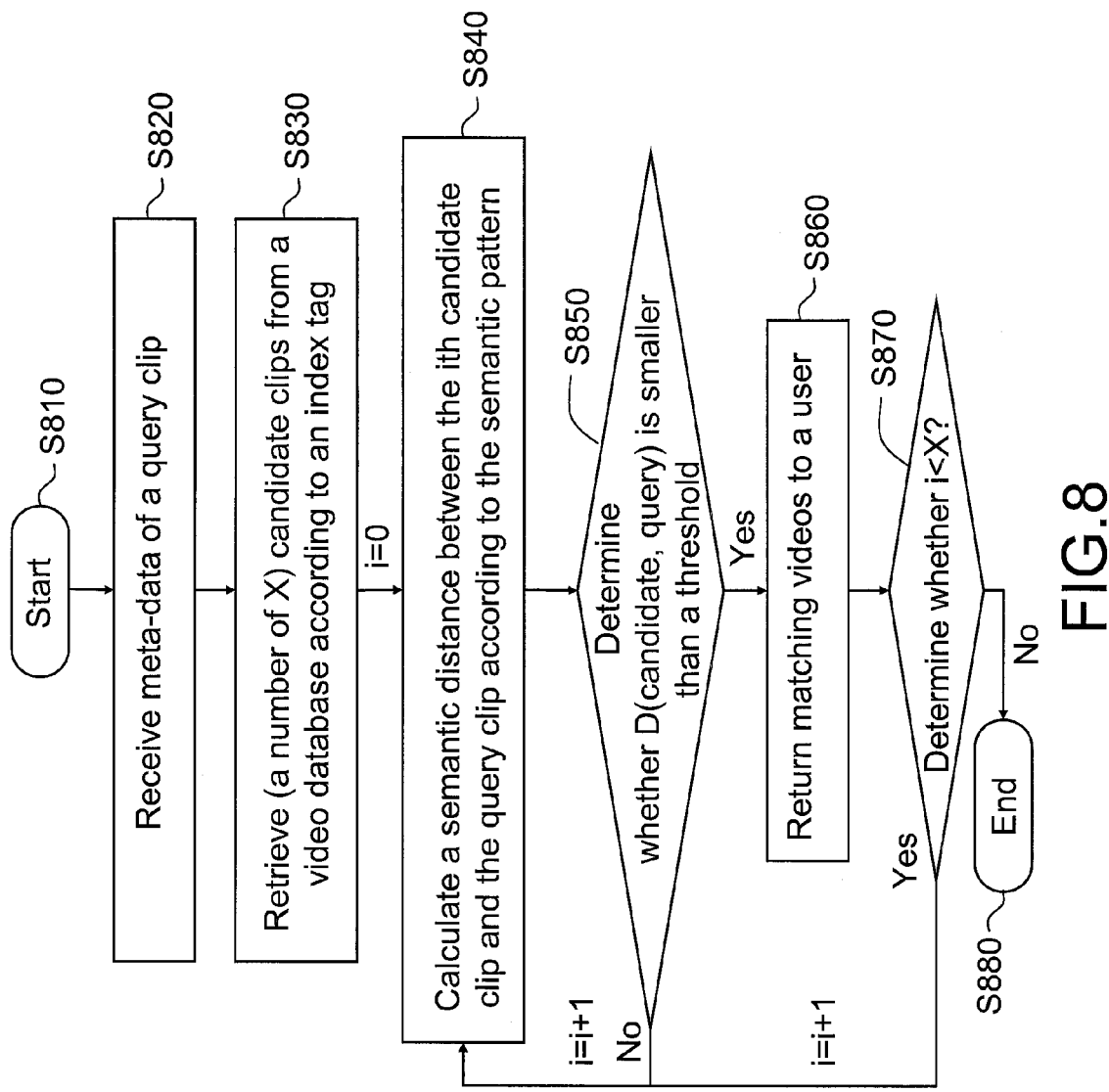
FIG. 8 is a diagram illustrating the procedure for retrieving similar video clips.

FIG. 8 is a diagram of an embodiment illustrating the procedure for retrieving similar video clips. Referring to FIG. 8, first, in step S810, it is started to search for similar video clips. In step S820, meta-data of a query clip is received. Next, in step S830, (a number of X) candidate clips are retrieved from the video database according to the index tag (i.e., the candidate clips and the query clip have the same index tag).

In step S840, the semantic distance between the $i^{th}$ candidate clip and the query clip is calculated according to the semantic pattern. Next, in step S850, whether the semantic distance D between the candidate clip and the query clip is smaller than a threshold is determined. If the semantic distance D is not smaller than the threshold, comparison regarding the next candidate clip i+1 is performed. If the semantic distance D is smaller than the threshold, the $i^{th}$ candidate clip is marked as a similar video clip that can be returned to the user.

In step S870, whether the comparison regarding all the X candidate clips has been performed is determined. If i<X, step S840 is executed to perform comparison regarding the next candidate clip i+1. If i=X, the procedure ends in step S880.

Figure 9:
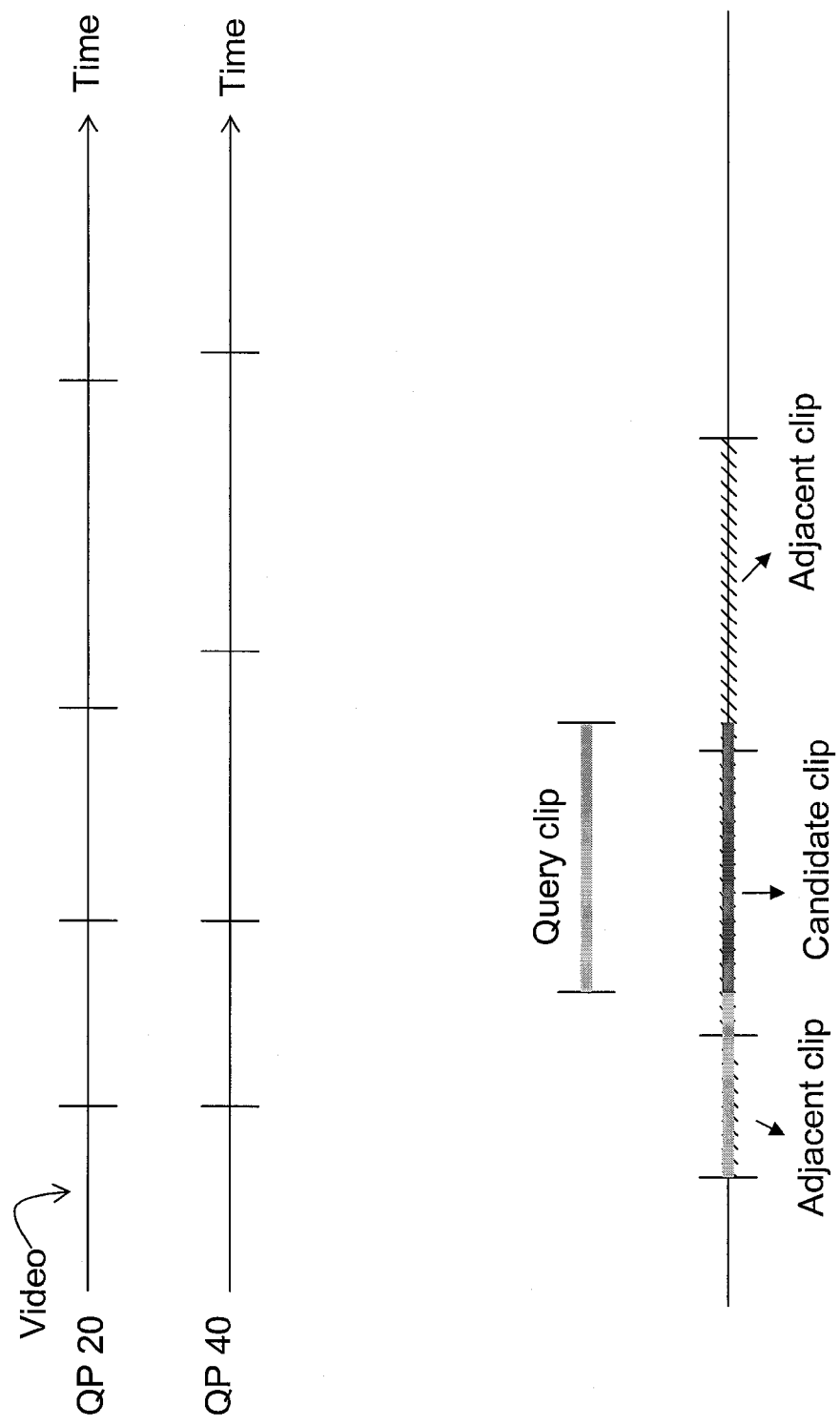
FIG. 9 is a diagram illustrating a method for comparing a query clip with candidate clips according to an embodiment of the disclosure.

In an embodiment, the semantic distance comparison operation described above can be expressed as:

$$D(c, q) = \sum_{K=0}^{L} |c_K - q_K|,$$

wherein $c_K$ is the $K^{th}$ semantic pattern of the $i^{th}$ candidate clip (the value thereof may be 1, −1, or 0), $q_K$ is the $K^{th}$ semantic pattern of the query clip, and L is the length of the query clip. Candidate Clips and Query Clip have the Same or Similar Index Tags In foregoing description, a video file may be segmented at scene change point so that all the shots obtained from the segmentation can have high similarities. Each section of the video file obtained by segmenting the video file according to the scene change point is referred to as a "shot". Whether a current frame is served as a shot boundary is determined according to, for example, the distance of HSV histogram between frames. Whether the current frame is served as a shot boundary is determined according to the obtained HSV histogram feature (a shot detection algorithm). The shot detection algorithm may give different results along with different resolutions or qualities of the video file. For example, as shown in FIG. 9, an error exists between the video with QP=20 and the video with QP=40 in the time domain.

For considering the displacement occurred by the different resolutions or qualities of the video file using aforesaid shot detection algorithm, while comparing the query clip with a candidate clip, the semantic pattern of the query clip may be compared with semantic patterns of the candidate clip and adjacent video clips. Namely, in the time domain, the semantic pattern of the query clip is compared with the semantic pattern of the video clip at the left to the semantic pattern of the video clip at the right in a sliding comparison manner By such manner, the chance of incorrect determination of comparing the query clip with the candidate clip will be significantly reduced.

As shown in FIG. 10, the query clip QP=26, the semantic pattern thereof is 010-11-1-11-11-10011-1-10000000-1. One candidate clip QP=32, the semantic pattern thereof is . . . 000-110-11-11-10011-10000000-1 . . . . In the present example, the query length is the length of the currently compared query clip. The threshold is (3×captured length)/10= (3×25)/10. Through calculation, the shortest distance=2. Since the shortest distance is smaller than the threshold, the candidate clip is determined to be a similar video file therefore is returned to the user. Another candidate clip QP=32, and the semantic pattern thereof is . . . 10-1010000000001101-1-111-1-1-1-11 . . . . Through calculation, the shortest distance=19. Since the shortest distance is greater than the threshold, the candidate clip is determined not to be a similar video file therefore is not returned to the user.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A video search method, configured to a video search engine, comprising:
receiving meta-data of a query clip, wherein the query clip is a part of a video, the meta-data comprises a first index tag and a first semantic pattern, and the first index tag is assigned by transforming features extracted from the video;
retrieving one or more candidate clips from at least one video database according to the first index tag, wherein the query clip and the candidate clips are converted into a same format; and
comparing the first semantic pattern with a semantic pattern of each of the candidate clips and adjacent video clips, and marking each of the candidate clips as a returnable video clip or a non-returnable video clip according to a comparison result, wherein the candidate clips marked as the returnable video clip are served as a query result matching the query clip.

2. The video search method according to claim 1, wherein the step of comparing the first semantic pattern with the semantic pattern of each of the candidate clips comprises:
calculating a semantic distance between the first semantic pattern and the semantic pattern of each of the candidate clips; and
comparing each of the semantic distances with a threshold, marking the corresponding candidate clip as the returnable video clip when the semantic distance is smaller than the threshold, and marking the corresponding candidate clip as the non-returnable video clip when the semantic distance is greater than the threshold.

3. The video search method according to claim 1, wherein after a user performs a text query and retrieves a video file and corresponding meta-data, a part of the video file of the time length selected by the user is served as the meta-data of the query clip.

4. A video search system, comprising:
a search engine, with at least a processor which is configured for receiving meta-data of a query clip, wherein the meta-data comprises a first index tag and a first semantic pattern, and the first index tag is assigned by transforming features extracted from the query clip; and
at least one video database, comprising a plurality of video clips, wherein the search engine retrieves one or more candidate clips from the video database according to the first index tag, converts the query clip and the candidate clips into a same format, compares the first semantic pattern with a semantic pattern of each of the candidate clips and adjacent video clips, and marks each of the candidate clips as a returnable video clip or a non-returnable video clip according to a comparison result, wherein the candidate clips marked as the returnable video clip are served as a query result matching the query clip.

5. The video search system according to claim 4, wherein the video database stores a plurality of video bitstreams and meta-data of the video bitstreams, wherein each of the meta-data is established by performing a segmentation process on the corresponding video bitstream through a segmentation detecting procedure to generate a plurality of shots, indexing the shots by assigning a corresponding index tag to each of the shots according to a content of the shot, and establishing a semantic pattern of each of the shots according to a video feature of the shot, wherein the meta-data comprises the index tags and the semantic patterns corresponding to the shots.

6. The video search system according to claim 5, wherein the procedure of performing the segmentation process on the corresponding video bitstream through the segmentation detecting procedure comprises segmenting the video bitstream according to a scene change point.

7. The video search system according to claim 6, wherein the scene change point is selected according to a transformation result of a Hue-Saturation-Value (HSV) histogram.

8. The video search system according to claim 7, wherein the transformation result is obtained according to a distance between two adjacent frames after a HSV histogram between the two adjacent frames is transformed.

9. The video search system according to claim 5, wherein the shots are indexed by assigning the corresponding index tag to each of the shots by adopting a motion vector (MV) direction of the shot.

10. The video search system according to claim 5, wherein the shots are indexed by assigning the corresponding index tag to each of the shots by adopting a length of the shot.

11. The video search system according to claim 5, wherein the shots are indexed by assigning the corresponding index tag to each of the shots by adopting an angle of hue in a Hue-Saturation-Value (HSV) color space of the shot.

12. The video search system according to claim 5, wherein the shots are indexed by assigning the corresponding index tag to each of the shots by adopting a combination of a MV direction, a length, and an angle of hue in a Hue-Saturation-Value (HSV) color space of the shot.

13. The video search system according to claim 4, wherein the procedure of comparing the first semantic pattern with the semantic pattern of each of the candidate clips comprises:
   calculating a semantic distance between the first semantic pattern and the semantic pattern of each of the candidate clips; and
   comparing each of the semantic distances with a threshold, marking the corresponding candidate clip as the returnable video clip when the semantic distance is smaller than the threshold, and marking the corresponding candidate clip as the non-returnable video clip when the semantic distance is greater than the threshold.

14. The video search system according to claim 4, wherein after a user performs a text query and retrieves a video file and corresponding meta-data, a part of the video file of the time length selected by the user is served as the meta-data of the query clip.

15. The video search system according to claim 4, wherein the video database is in a remote host, and the search engine establishes a communication channel with the remote host for accessing the video database.

16. A method for establishing a video database by a host, wherein the host comprises at least a processor, and wherein the processor is configured for:
   storing a plurality of video bitstreams into a database, wherein the database is stored in a storage device; and
   establishing meta-data of each of the video bitstreams, wherein each of the meta-data is established by:
   segmenting the video bitstream according to a scene change point to generate a plurality of shots;
   indexing the shots by assigning a corresponding index tag to each of the shots according to a content of the shot; and
   establishing a semantic pattern of each of the shots according to a video feature of the shot, wherein the meta-data at least comprises the index tags and the semantic patterns corresponding to the shots.

17. The video database establishing method according to claim 16, wherein the scene change point is selected according to a transformation result of a Hue-Saturation-Value (HSV) histogram.

18. The video database establishing method according to claim 17, wherein the transformation result is obtained according to a distance between two adjacent frames after a HSV histogram between the two adjacent frames is transformed.

19. The video database establishing method according to claim 16, wherein the shots are indexed by assigning the corresponding index tag to each of the shots by adopting a motion vector (MV) direction of the shot.

20. The video database establishing method according to claim 16, wherein the shots are indexed by assigning the corresponding index tag to each of the shots by adopting a length of the shot.

21. The video database establishing method according to claim 16, wherein the shots are indexed by assigning the corresponding index tag to each of the shots by adopting an angle of hue in a HSV color space of the shot.

22. The video database establishing method according to claim 16, wherein the shots are indexed by assigning the corresponding index tag to each of the shots by adopting a combination of a MV direction, a length, and an angle of hue in a Hue-Saturation-Value (HSV) color space of the shot.

* * * * *